United States Patent
Ewida et al.

(10) Patent No.: US 8,976,921 B2
(45) Date of Patent: Mar. 10, 2015

(54) FUEL BUNDLE FLOW LIMITER

(75) Inventors: Khaled M. Ewida, Garland, TX (US); Gerald A. Luciano, Wilmington, NC (US); Milt H. Loper, III, Mountain View, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1297 days.

(21) Appl. No.: 12/968,826

(22) Filed: Dec. 15, 2010

(65) Prior Publication Data

US 2012/0155600 A1 Jun. 21, 2012

(51) Int. Cl.
G21C 15/00 (2006.01)
G21C 3/322 (2006.01)
G21C 3/33 (2006.01)
E04H 4/00 (2006.01)
A01G 9/02 (2006.01)
E04H 5/00 (2006.01)

(52) U.S. Cl.
CPC . *G21C 3/322* (2013.01); *E04H 5/00* (2013.01); *E04H 4/00* (2013.01); *G21C 3/3305* (2013.01); *Y02E 30/38* (2013.01)
USPC .................................. 376/395; 47/65.6; 4/507

(58) Field of Classification Search
CPC ............ E04H 4/00; E04H 5/00; G21C 3/322; G21C 3/3305; Y02E 30/38
USPC ................. 376/395; 47/65.6; 4/507
See application file for complete search history.

(56) References Cited

U.S. PATENT DOCUMENTS

| | | | | |
|---|---|---|---|---|
| 5,016,776 A | * | 5/1991 | Falzarano et al. | 220/305 |
| 5,267,285 A | * | 11/1993 | Ekeroth et al. | 376/352 |
| 6,175,606 B1 | * | 1/2001 | Soderberg | 376/313 |
| 6,817,043 B2 | * | 11/2004 | Zars | 4/504 |
| D563,529 S | * | 3/2008 | Labonte | D23/261 |
| 2002/0078496 A1 | * | 6/2002 | Mullings | 4/507 |
| 2004/0093666 A1 | * | 5/2004 | Zars | 4/507 |
| 2004/0096026 A1 | | 5/2004 | Choe et al. | |
| 2008/0148474 A1 | * | 6/2008 | Witt | 4/613 |
| 2012/0267296 A1 | * | 10/2012 | Epstein et al. | 210/163 |

FOREIGN PATENT DOCUMENTS

| | | | | | |
|---|---|---|---|---|---|
| CZ | 281737 A | * | 5/1994 | | |
| JP | 55027532 A | * | 2/1980 | | F16K 31/18 |

* cited by examiner

*Primary Examiner* — Frank J McGue
(74) *Attorney, Agent, or Firm* — Harness, Dickey & Pierce, P.L.C.

(57) ABSTRACT

A fuel bundle flow limiter according to a non-limiting embodiment of the present invention may include a plurality of base sections, wherein each of the plurality of base sections has at least one opening. A plurality of channels may separate the plurality of base sections. A plurality of vertical webs may extend from the plurality of base sections. A locking tab may be disposed in at least one of the plurality of vertical webs. By using the flow limiter, the moisture carry over (MCO) level at the exit of the fuel bundle may be decreased, thereby reducing radiation exposure to plant operators and reducing damage to reactor equipment.

20 Claims, 13 Drawing Sheets

FUEL BUNDLE FLOW LIMITER

BACKGROUND

1. Field

The present disclosure relates to devices for reducing a moisture carry over (MCO) level at the exit of a fuel bundle of a nuclear reactor.

2. Description of Related Art

Water enters a fuel bundle of a boiling water reactor (BWR) as a liquid and exits as steam, wherein the steam is used to drive a turbine. The water typically enters a fuel bundle through a tie plate. FIG. 1 is a perspective view of a conventional tie plate for a fuel bundle of a boiling water reactor. Referring to FIG. 1, a conventional tie plate 100 (e.g., lower tie plate) may include a rim 102 defining an entrance 104 with arc members 106 extending from the rim 102 and converging below a center of the entrance 104.

During the operation of a boiling water reactor, water is supplied to a fuel bundle through the entrance 104 of the tie plate 100. Ideally, the water exits the fuel bundle as pure steam. However, after a certain number of cycles, a fuel bundle will inevitably become a low power bundle and will be moved to one of the outer, peripheral rows along with the other low power bundles. Nevertheless, even if a low power bundle is arranged in one of the outer, peripheral rows, the steam exiting the low power bundle may still contain an increased amount of water droplets if the amount of incoming water exceeds the ability of the low power bundle to convert all of the water to steam.

The amount of water droplets in the steam exiting a fuel bundle may be referred to as a moisture carry over (MCO) level. A high moisture carry over level is detrimental to the operation of a boiling water reactor for at least two reasons. First, a high moisture carry over level increases the amount of radiation exposure to plant operators. Second, a high moisture carry over level causes damage to the blades of the steam turbine. Consequently, nuclear power plants typically opt to reduce core flow in order to decrease moisture carry over levels. However, a reduction in core flow results in a reduction in reactor power which ultimately results in decreased revenues.

SUMMARY

A fuel bundle flow limiter according to a non-limiting embodiment of the present invention may include a plurality of base sections, each of the plurality of base sections having at least one opening; a plurality of channels separating the plurality of base sections; a plurality of vertical webs extending from the plurality of base sections; and a locking tab disposed in at least one of the plurality of vertical webs.

The plurality of base sections of the fuel bundle flow limiter may be disposed in a coplanar arrangement. The plurality of base sections may also be identical to each other. Collectively, the plurality of base sections may faun a circular shape based on a plan view. The fuel bundle flow limiter may include three base sections.

A shape of the at least one opening in each of the plurality of base sections may resemble the shape of the corresponding base section. The at least one opening in each of the plurality of base sections may be in the for in of a plurality of holes.

The fuel bundle flow limiter may include three channels. Each of the plurality of channels may be between adjacent base sections of the fuel bundle flow limiter. The plurality of channels may converge at a center of the collective arrangement of the plurality of base sections. A depth of each of the plurality of channels may increase in a direction toward a center of the collective arrangement of the plurality of base sections.

The plurality of vertical webs of the fuel bundle flow limiter may extend perpendicularly from the plurality of base sections. Each of the plurality of vertical webs may also extend from an edge of each of the plurality of base sections. Two vertical webs may extend from each of the plurality of base sections. A first vertical web may be parallel to an adjacent second vertical web, wherein the first and second vertical webs extend from different base sections.

The locking tab may be disposed in each of the plurality of vertical webs. Each of the plurality of channels of the fuel bundle flow limiter may be flanked by a pair of vertical webs, and the locking tab may extend into the channel flanked by the pair of vertical webs.

The fuel bundle flow limiter may further include a bottom strip underneath each of the plurality of channels, wherein the bottom strip joins adjacent vertical webs. The bottom strip may extend along bottom edges of the adjacent vertical webs. The bottom strip may also be curved.

A fuel bundle assembly according to a non-limiting embodiment of the present invention may include a fuel channel; a plurality of fuel rods within the fuel channel; a lower tie plate and an upper tie plate at opposing ends of the fuel channel, the lower tie plate including an entrance to the fuel bundle assembly, and the upper tie plate including an exit to the fuel bundle assembly; and a flow limiter mounted on at least one of the lower tie plate and upper tie plate, the flow limiter configured to reduce a flow area of at least one of the entrance and exit to the fuel bundle assembly.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
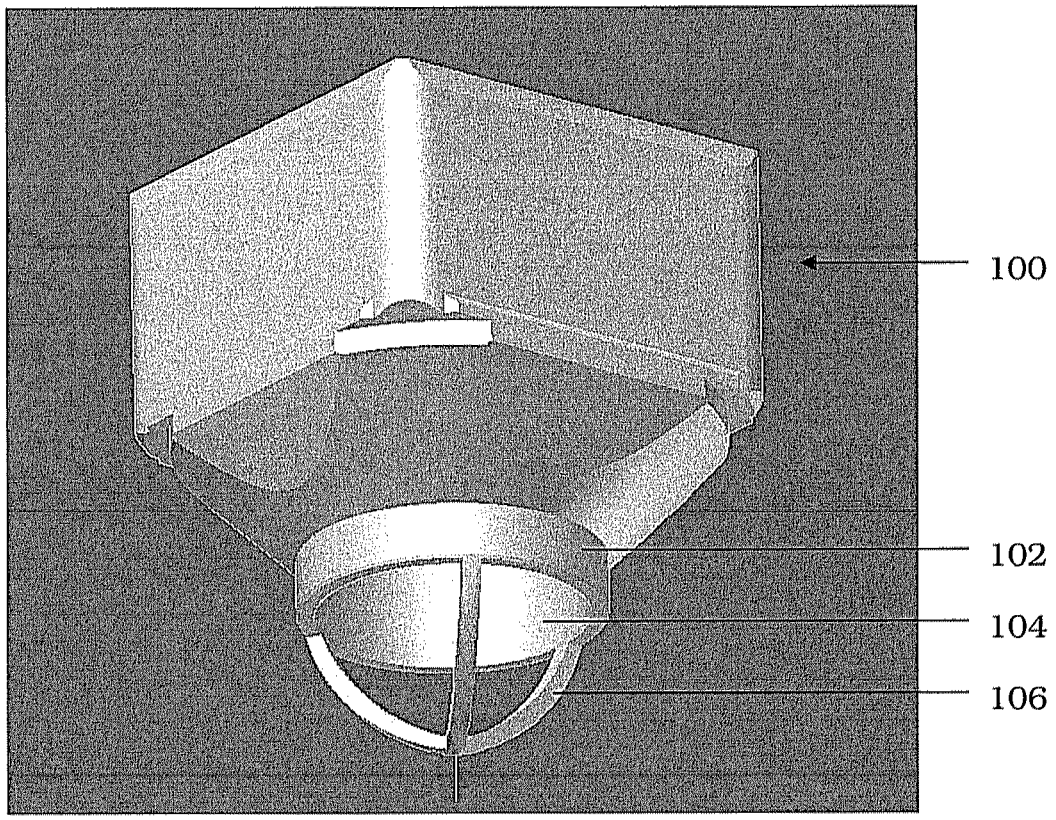
FIG. 1 is a perspective view of a conventional tie plate for a fuel bundle of a boiling water reactor (BWR).
Figure 2A:
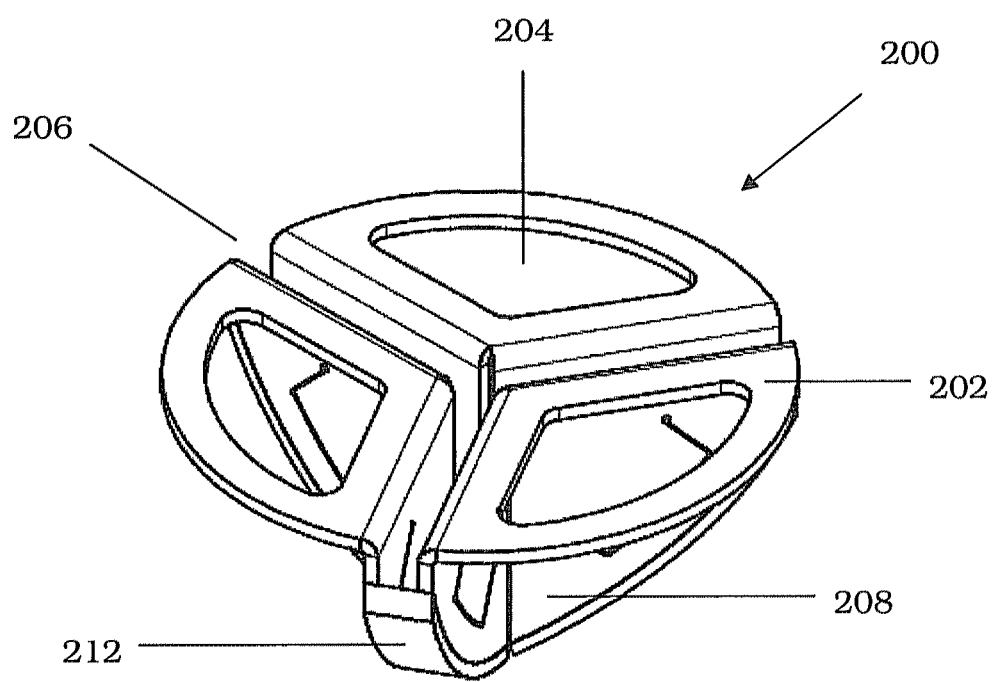
FIGS. 2A-2E are various views of a fuel bundle flow limiter according to a non-limiting embodiment of the present invention.
Figure 2B:
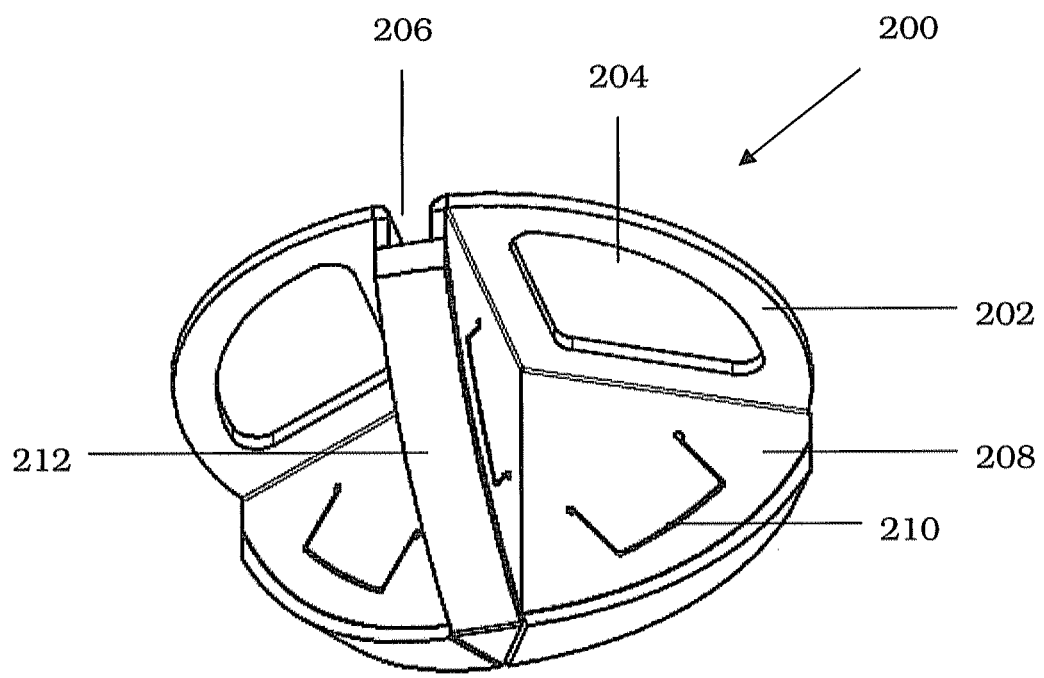
Figure 2C:
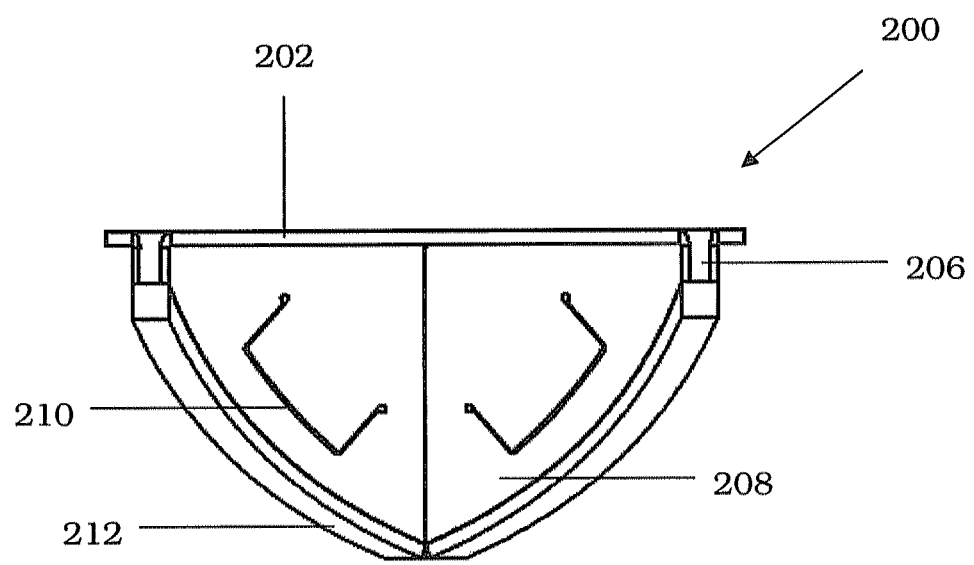
Figure 2D:
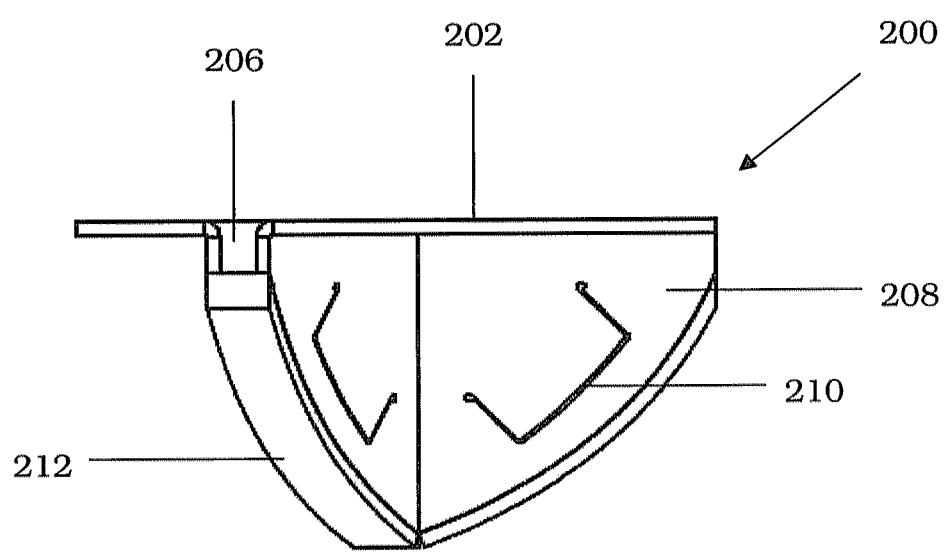
Figure 2E:
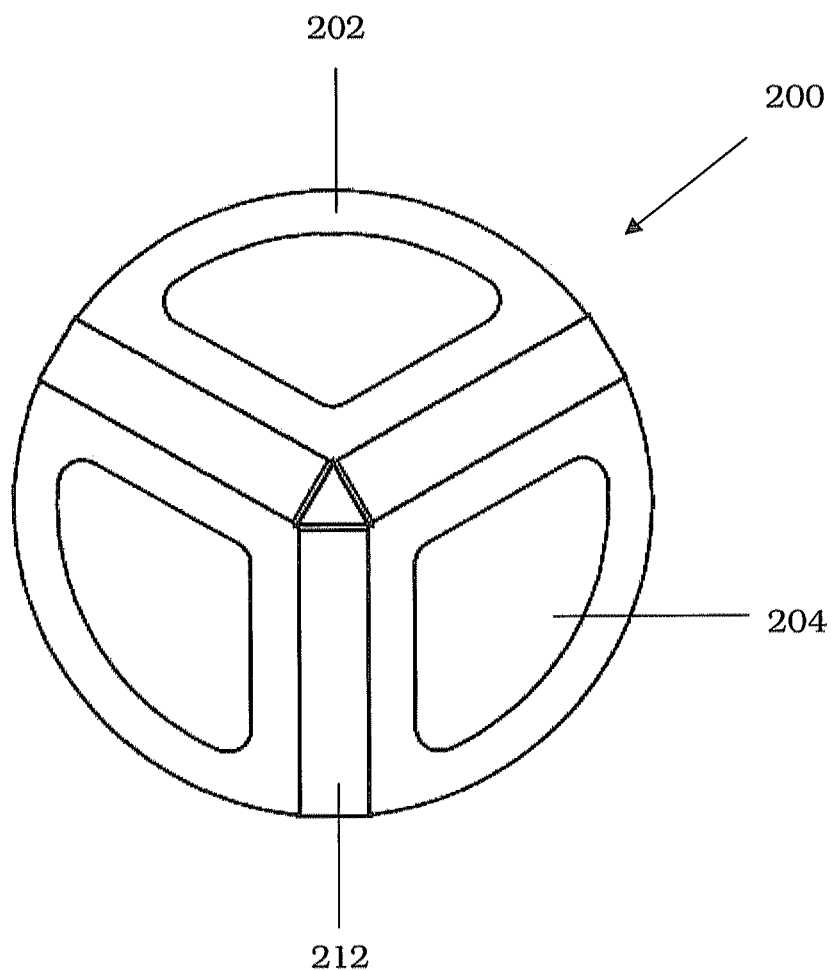

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on,"

"directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the term first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIGS. 2A-2E are various views of a fuel bundle flow limiter according to a non-limiting embodiment of the present invention. Referring to FIGS. 2A-2E, a fuel bundle flow limiter 200 includes a plurality of base sections 202 that are arranged in proximity to each other. The plurality of base sections 202 may be disposed in a coplanar arrangement. Stated more clearly, the upper surfaces of the plurality of base sections 202 may be level with each other and lie within the same plane. The plurality of base sections 202 may also be identical to each other with regard to size and shape.

Collectively, the plurality of base sections 202 may form a circular shape based on a plan view. However, it should be understood that example embodiments are not limited to the circular shape shown in the drawings. Rather, the plurality of base sections 202 may collectively form any shape as long as the flow limiter 200 is configured to be properly fitted to the pertinent tie plate (e.g., tie plate 100). Furthermore, although three base sections 202 are shown in FIGS. 2A-2E, it should be understood that example embodiments are not limited thereto. For instance, depending on the tie plate to be fitted, the fuel bundle flow limiter 200 may be designed to include four base sections (instead of the three base sections 202 shown in the drawings), wherein each of the four base sections would resemble a quadrant of a circle.

Each of the plurality of base sections 202 has an opening 204 that extends completely through each of the plurality of base sections 202. The shape of the at least one opening 204 may correspond to that of each of the plurality of base sections 202. For instance, the opening 204 may be three-sided, wherein two of the sides are linear while the third side is curved. Similarly, the base section 202 with the opening 204 may also be three-sided, wherein two of the sides are linear while the third side is curved. Although the openings 204 are shown in the drawings as being centered within each base section 202, other variations are possible. For example, the opening 204 may be formed so as to be closer to the corner formed by the two linear sides. The opening 204 may also be smaller than the dimension shown in the drawings. However, it should be understood that the present invention is not to be limited by any of the above examples. Because the openings 204 are calculated to limit the incoming water flow so as to provide a desired moisture carry over level at the exit of the fuel bundle, various shapes, sizes, positions, and quantities of the openings 204 may be used.

A plurality of channels 206 separate the plurality of base sections 202. As shown in FIGS. 2A-2E, each of the channels 206 are between adjacent base sections 202. The channels 206 converge at a center of the collective arrangement of the base sections 202. The channels 206 of the flow limiter 200 may be identical in length, width, and depth. However, the depth of each of the channels 206 may increase in a direction towards a center of the collective arrangement of the base sections 202. Stated more clearly, the channels 206 may be deeper near the center of the flow limiter 200. Although the depth of each channel 206 may vary based on the distance from the center of the collective arrangement of the base sections 202, the width of each channel 206 may remain constant regardless of the distance from the center. Also, although the flow limiter 200 in the drawings is illustrated as having three channels 206, it should be understood that the present invention is not limited thereto. Rather, the quantity and configuration of the channels 206 may vary based on the tie plate to be fitted with the flow limiter 200.

A plurality of vertical webs 208 extend from the plurality of base sections 202 of the flow limiter 200. In particular, each of the plurality of vertical webs 208 extends from an edge of the base sections 202. For instance, vertical webs 208 may extend from the two inside, linear edges of the base sections 202. Thus, two vertical webs 208 may extend from each of the plurality of base sections 202 (for a total of six vertical webs 208). The plurality of vertical webs 208 may extend perpendicularly from the plurality of base sections 202. As shown in the drawings, the linear, vertical edge of the first vertical web 208 extending from the base section 202 is joined with the linear, vertical edge of the second vertical web 208 extending from the same base section 202. Alternatively, instead of joining two separate vertical webs 208, a single semicircular sheet may be folded. In such a case, three folded sheets will be utilized (instead of six individual vertical webs 208) for the flow limiter 200.

Each vertical web 208 may be three-sided, wherein two of the sides are linear while a third side is curved. The two linear sides of the vertical web 208 may form a right angle. When assembled, the horizontal, linear edges of two joined vertical webs 208 will be additionally coupled with the two linear edges of a base section 202. Each of the plurality of channels 206 of the flow limiter 200 is flanked by a pair of vertical webs 208. Additionally, the vertical web 208 of one base section 202 may be parallel to an adjacent vertical web 208 of a different base section 202. Although various examples have been discussed above, it should be understood that the shapes and dimensions of the vertical webs 208 may vary based on the tie plate to be fitted with the flow limiter 200. The vertical webs 208 of the flow limiter 200 help reduce flow vortices at the fuel bundle entrance and improves flow distribution across the fuel bundle.

A locking tab 210 is disposed in at least one of the plurality of vertical webs 208 of the flow limiter 200. The locking tab 210 extends into the channel 206 that is flanked by the vertical web 208. As shown in FIGS. 2A-2E, the locking tab 210 may be disposed in each of the plurality of vertical webs 208 (for a total of six locking tabs 210). In such a situation, the locking tabs 210 for a pair of opposing vertical webs 208 will extend toward each other into the channel 206 between the pair of opposing vertical webs 208. As a result, a distance between the ends of a pair of locking tabs 210 will be less than a width of the channel 206. The end of the locking tab 210 may face the curved edge of the vertical web 208 and may be spaced accordingly from the curved edge depending on the thickness of the arc member 106 of the tie plate 100 (e.g., FIG. 1). The end of the locking tab 210 may also have a curvature that corresponds to that of the arc member 106 of the tie plate 100 that is to be fitted with the flow limiter 200. The locking tab 210 may be an angular U-shaped structure that is integrally formed from the vertical web 208 itself. However, it should be understood that the locking tab 210 is not limited to any of the above embodiments but, instead, may be modified to have different shapes, dimensions, and configurations so as to better fit the intended arc member 106 of a tie plate 100.

The fuel bundle flow limiter 200 further includes a bottom strip 212 underneath each of the plurality of channels 206. The bottom strip 212 joins the adjacent vertical webs 208 of the flow limiter 200. The bottom strip 212 may extend along the bottom curved edges of the adjacent vertical webs 208. As a result, the bottom strip 212 may also be curved. Because the flow limiter 200 in FIGS. 2A-2E is illustrated as having three channels 206, three bottom, strips 212 will be utilized. As shown in the drawings, the bottom strips 212 may converge at a triangular junction. However, it should be understood that if the flow limiter has, for instance, four channels 206, then four bottom strips 212 will be utilized, wherein the four bottom strips 212 may converge at a square junction. It should also be understood that the materials for forming the flow limiter 200 are not particularly limited as long as the material is suitable for use in a reactor environment.

Figure 3A:
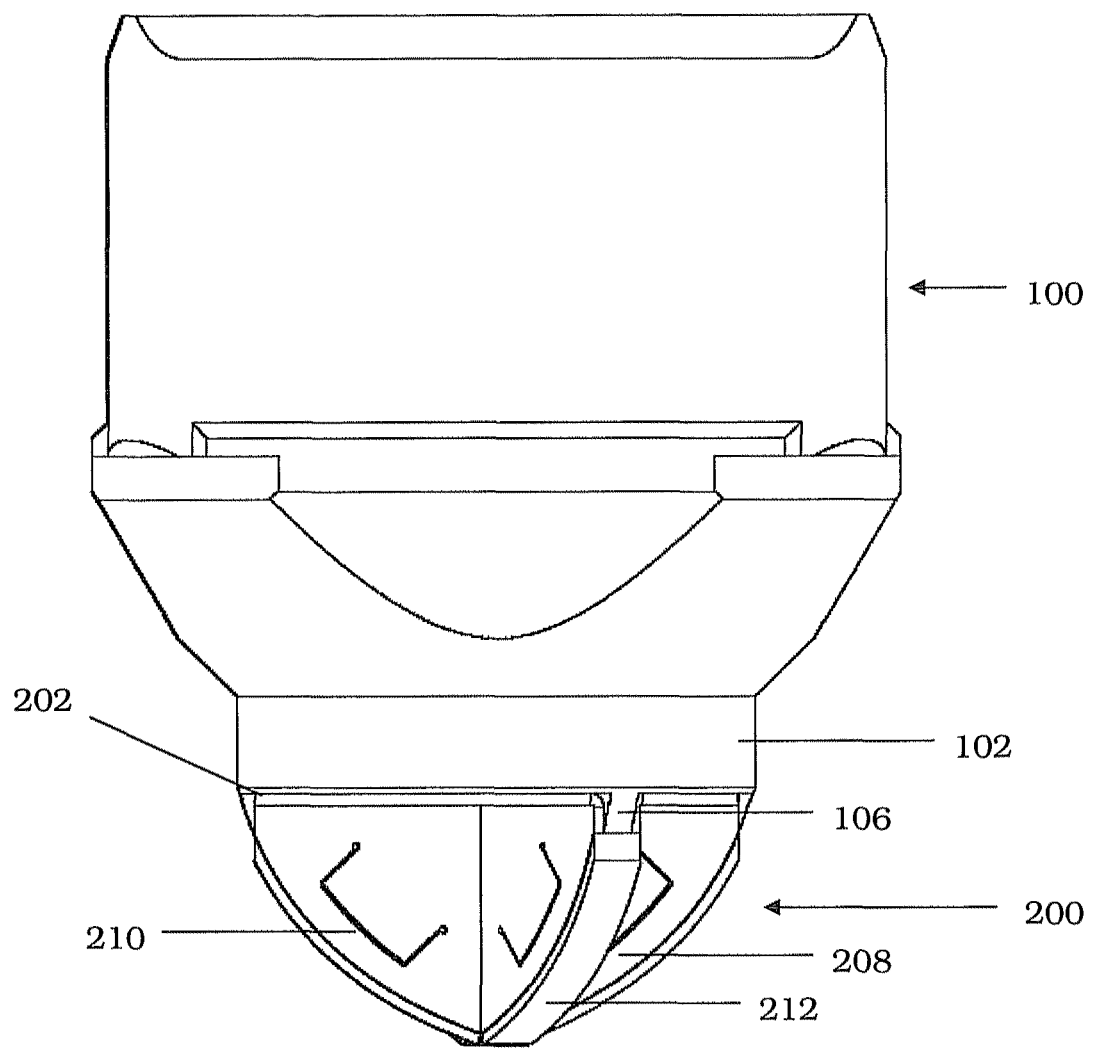
FIGS. 3A-3C are various views of the fuel bundle flow limiter of FIGS. 2A-2E as mounted on a tie plate.
Figure 3B:
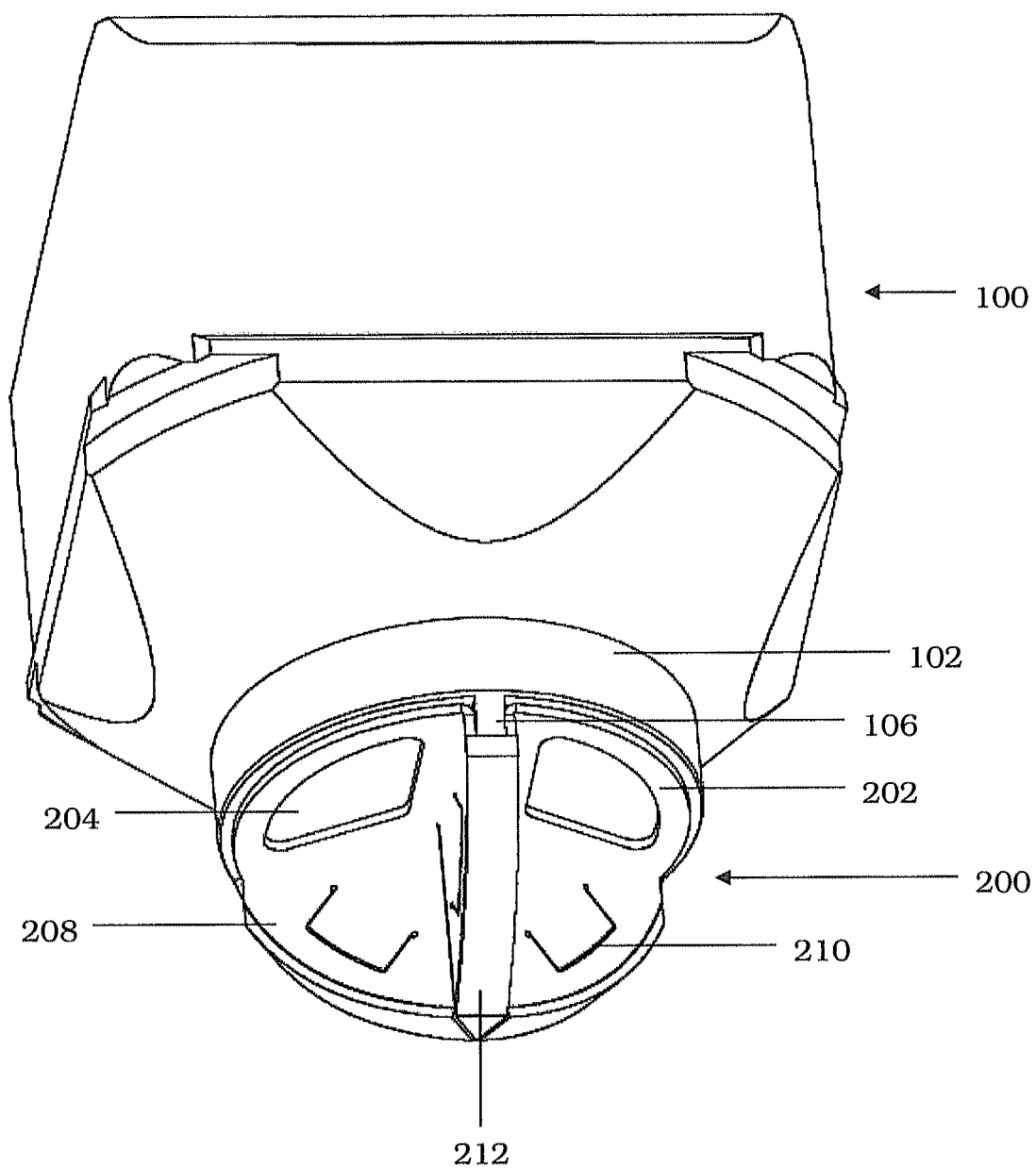
Figure 3C:
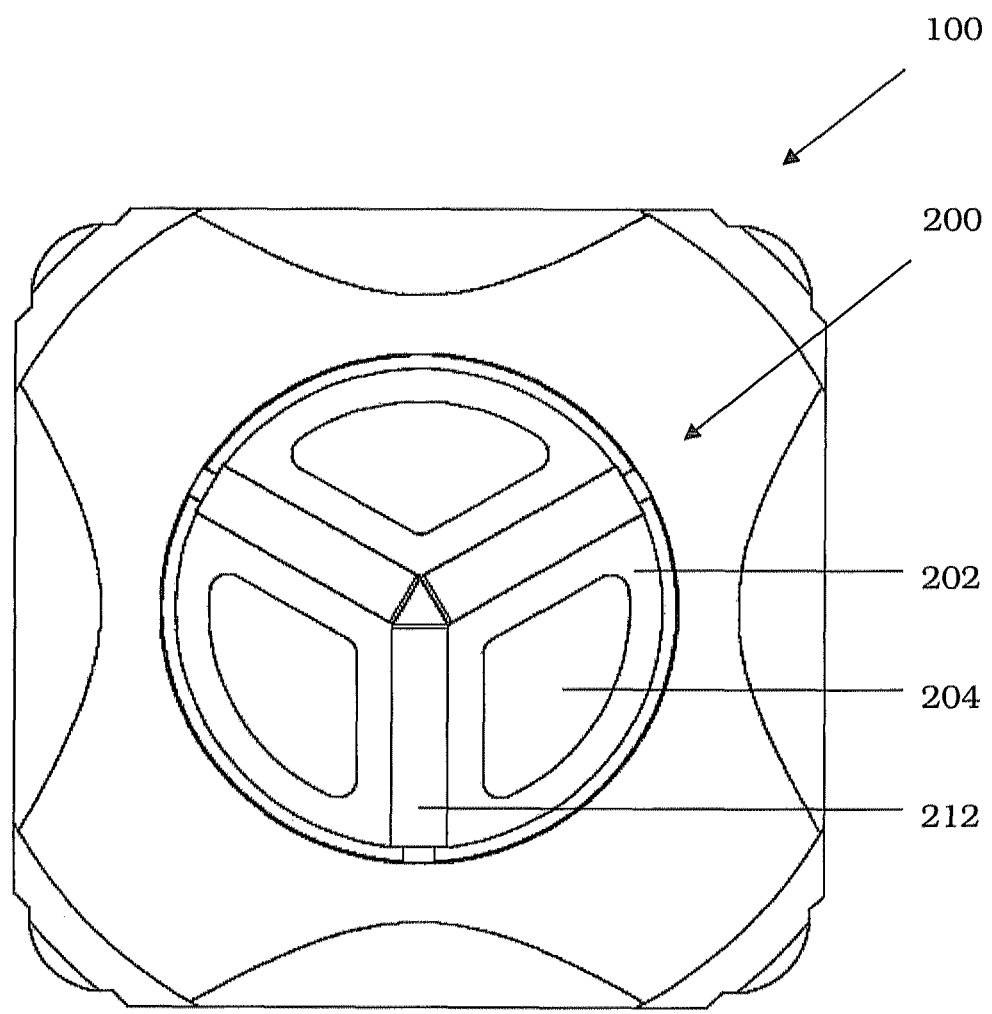

FIGS. 3A-3C are various views of the fuel bundle flow limiter of FIGS. 2A-2E as mounted on a tie plate. In FIGS. 3A-3C, the flow limiter 200 of FIGS. 2A-2E may be mounted/fitted onto the tie plate 100 of FIG. 1. As described above, the flow limiter 200 is a cap-like device that is configured to snap onto the arc members 106 of the tie plate 100. Stated in further detail, when the flow limiter 200 is fitted to the tie plate 100, the locking tabs 210 of the flow limiter 200 will ensure that the arc members 106 of the tie plate 100 remains between the bottom strips 212 and the locking tabs 210 of the flow limiter 200. As a result, the flow limiter 200 will be securely mounted onto the tie plate 100.

During scheduled outages at a nuclear power plant, fuel bundles that have become low power bundles (e.g., after two cycles) are moved away from the center and toward the periphery of the reactor core. For instance, the low power bundles may be moved to the first, second, or third rows of the reactor periphery. During such outages, the flow limiter 200 according to example embodiments may be fitted to the low power bundles. Due to the snap-on design of the flow limiters 200, the installation time may be relatively short. Because of the specific nature of each low power bundle, a flow limiter 200 may be individually designed for a low power bundle so as to attain the desired moisture carry over level at the fuel bundle exit. As a result of the incoming water flow for the low power bundles being reduced by the flow limiters 200, more flow will actually be directed to the high power bundles, thus increasing the efficiency of the power generation process.

Figure 4A:
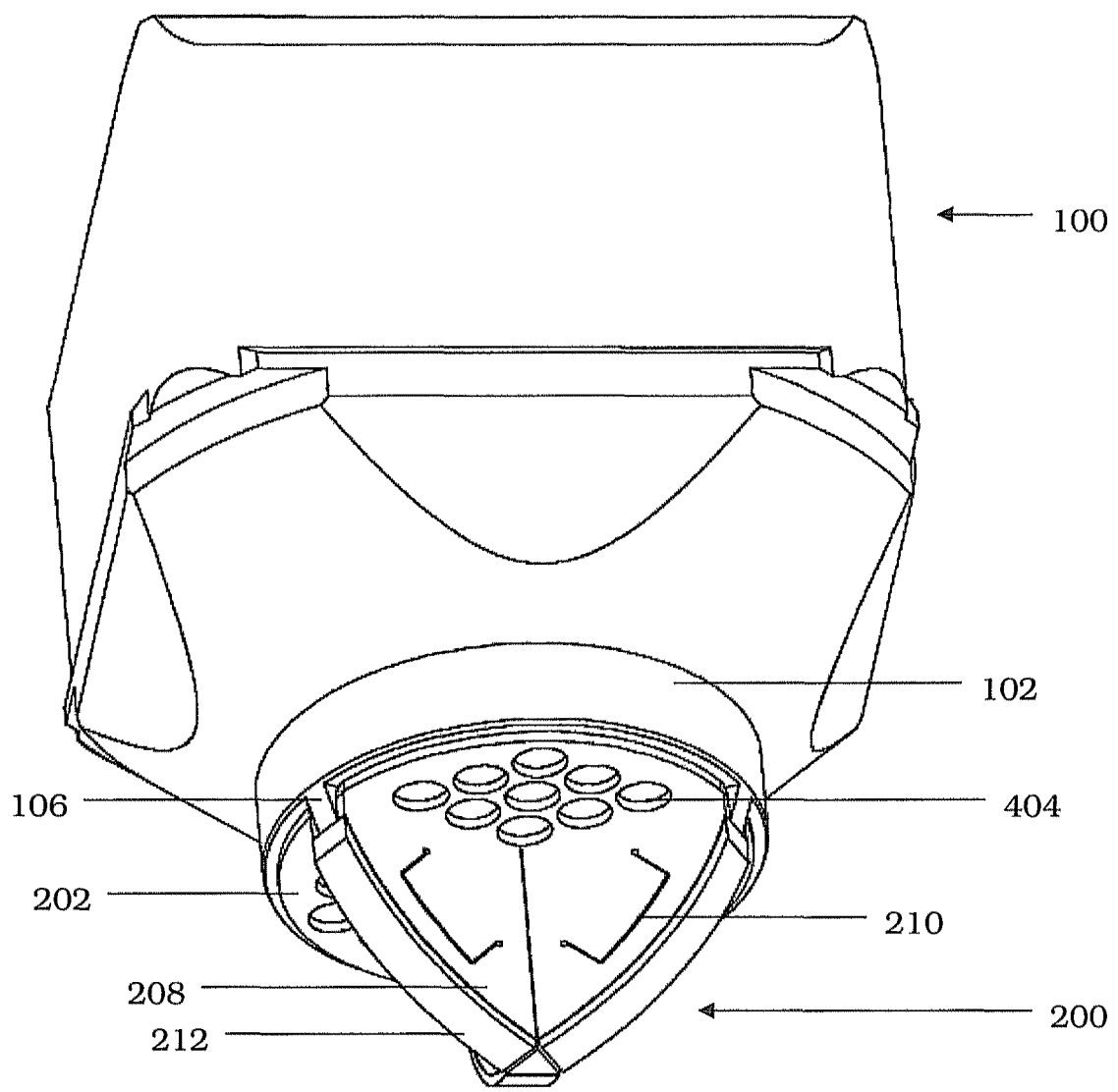
FIGS. 4A-4B are various views of another fuel bundle flow limiter according to a non-limiting embodiment of the present invention as mounted on a tie plate.
Figure 4B:
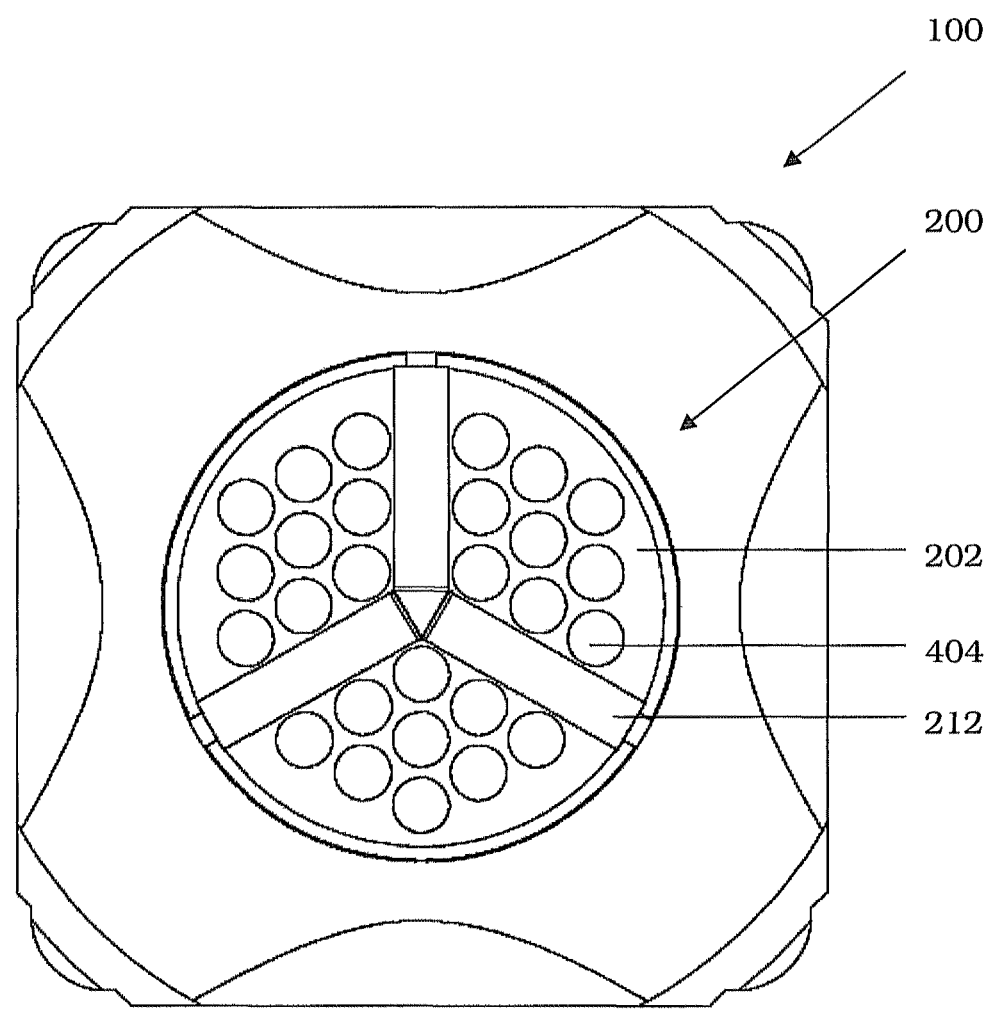

FIGS. 4A-4B are various views of another fuel bundle flow limiter according to a non-limiting embodiment of the present invention as mounted on a tie plate. In FIGS. 4A-4B, a flow limiter 200 may be mounted/fitted onto the tie plate 100 of FIG. 1. The flow limiter 200 of FIGS. 4A-4B may be as described above in connection with FIGS. 2A-2E, except that the opening in each of the base sections 202 are in the form of a plurality of holes 404. Alternatively, the opening in each of the base sections 202 may be more grid-like in nature (not shown). In another non-limiting embodiment, the opening in each of the base sections 202 may be in the form of a plurality of slits (not shown), wherein the slits may be continuous or fragmented within each base section 202 and may be arranged linearly or concentrically. However, it should be understood that the opening in each of the base sections 202 of the flow limiter 200 is not limited by any of the above examples. Rather, the opening in each of the base sections 202 may be modified and optimized as needed to limit the incoming water flow so as to attain the proper moisture carry over level at the fuel bundle exit.

By using the flow limiter according to example embodiments, the incoming water flow for a low power bundle may be selectively reduced so as to decrease the moisture carry over level at the fuel bundle exit to acceptable levels. Thus, a method of controlling (e.g., reducing) the moisture carry over level at a fuel bundle exit may involve installing the flow limiter onto a tie plate corresponding to a low power bundle. As a result, the overall core flow may be maintained while individually restricting the flow for specific low power bundles. Because of the decreased moisture carry over level, the radiation exposure to humans and damage to reactor equipment may be reduced. Furthermore, because the overall core flow does not need to be reduced (in view of the flow limiters according to example embodiments which can be selectively applied to the low power bundles), a nuclear power plant may avoid having to reduce reactor power for the sake of decreasing moisture carry over levels, which will consequently help avoid lost revenues associated with reduced reactor power.

Although the above description generally pertained to the application of the fuel bundle flow limiter to a lower tie plate (entrance of fuel bundle), it should be understood that the fuel bundle flow limiter may also be configured and applied to an upper tie plate (exit of fuel bundle) to limit the saturated water flow rate and in return reduce the moisture carry over (MCO) level at the fuel bundle exit.

Figure 5:
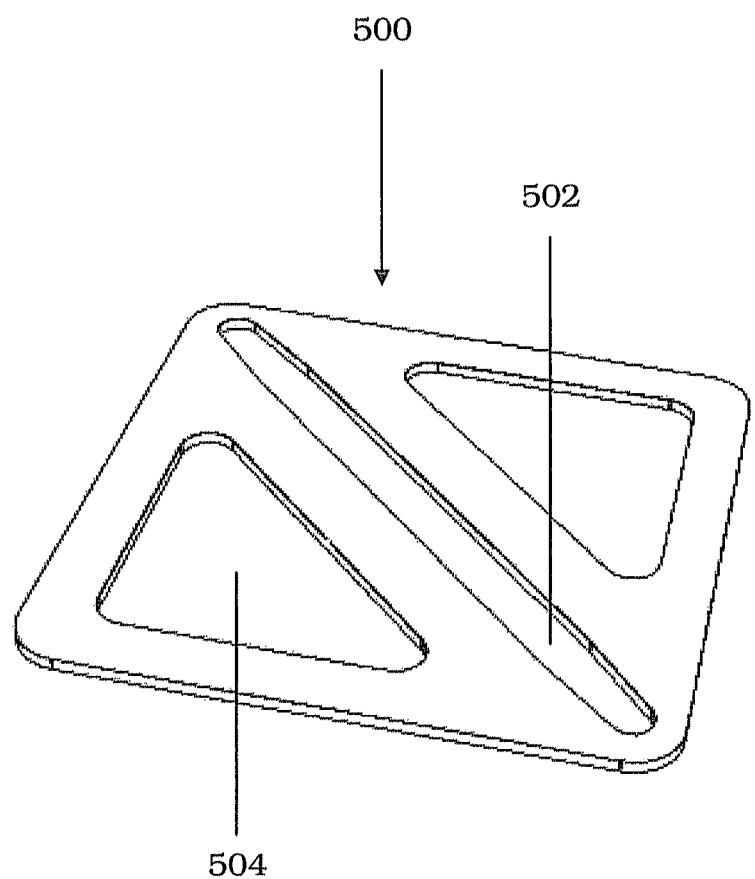
FIG. 5 is a perspective view of another fuel bundle flow limiter according to a non-limiting embodiment of the present invention.
Figure 6:
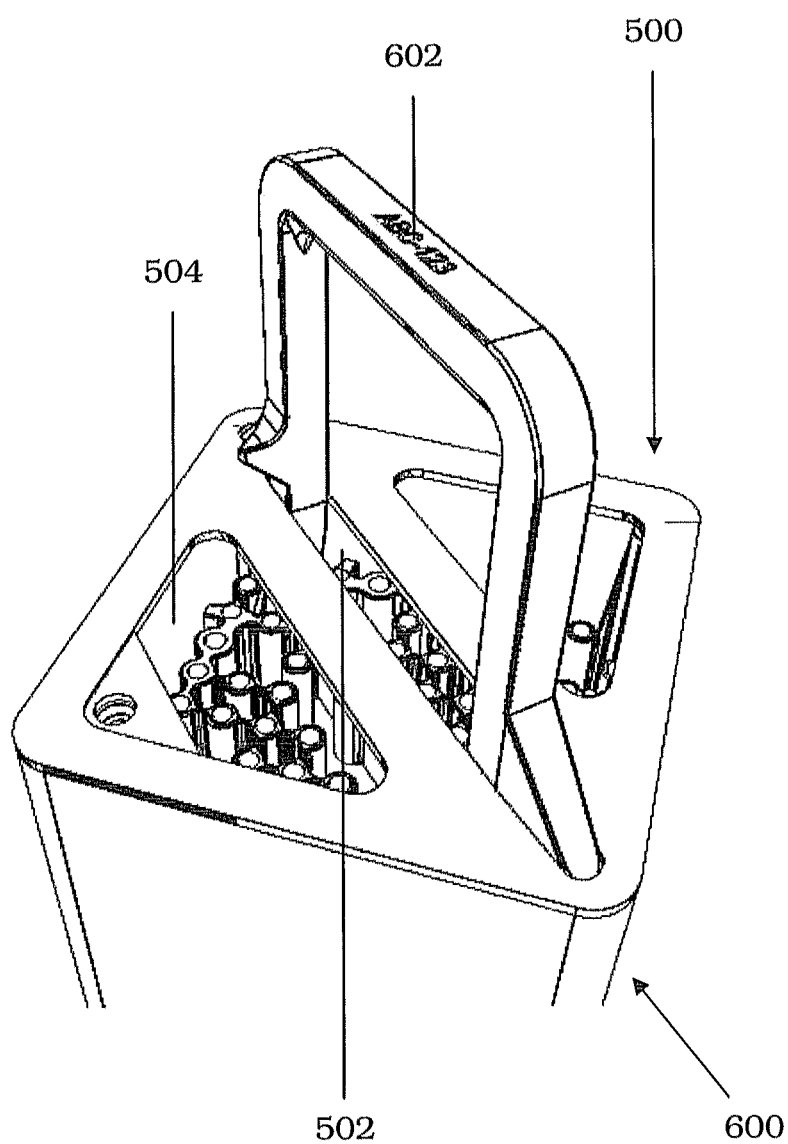
FIG. 6 is a perspective view of the fuel bundle flow limiter of FIG. 5 as mounted on a tie plate.

FIG. 5 is a perspective view of another fuel bundle flow limiter according to a non-limiting embodiment of the present invention. FIG. 6 is a perspective view of the fuel bundle flow limiter of FIG. 5 as mounted on a tie plate. Referring to FIG. 5, the fuel bundle flow limiter 500 is in planar form and includes a diagonal slot 502 between two openings 504. Referring to FIG. 6, the fuel bundle flow limiter 500 may be mounted onto a tie plate 600 (e.g., upper tie plate). As shown in the drawings, the diagonal slot 502 is designed to receive the handle 602 of the tie plate 600 during mounting, while the openings 504 serve as flow areas. Although various shapes and dimensions are shown in the drawings, it should be understood that other shapes, dimensions, and configurations may also be used depending on the tie plate to be fitted with the fuel bundle flow limiter and/or the desired flow. Additionally, it should be understood that the features taught in connection with the fuel bundle flow limiter 200 are also applicable to the fuel bundle flow limiter 500. Furthermore, the fuel bundle flow limiter 500 may be used in lieu of or in addition to the fuel bundle flow limiter 200.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A fuel bundle flow limiter comprising:
  a plurality of base sections, each of the plurality of base sections having at least one opening and inner and outer peripheral edges that surround the at least one opening, each of the inner peripheral edges facing an inner peripheral edge of an adjacent base section of the plurality of base sections;
  a plurality of paired vertical webs extending from the inner peripheral edges of the plurality of base sections, each of the plurality of paired vertical webs defining a channel therebetween to provide a plurality of channels corresponding to the plurality of paired vertical webs, the plurality of channels separating the plurality of base sections; and
  a locking tab disposed in at least one of the plurality of vertical webs.

2. The fuel bundle flow limiter of claim 1, wherein the plurality of base sections are disposed in a coplanar arrangement.

3. The fuel bundle flow limiter of claim 1, wherein the plurality of base sections collectively form a circular shape based on a plan view.

4. The fuel bundle flow limiter of claim 1, wherein a shape of the at least one opening corresponds to a shape of at least one of the plurality of base sections.

5. The fuel bundle flow limiter of claim 1, wherein the at least one opening includes a plurality of holes.

6. The fuel bundle flow limiter of claim 1, wherein each of the plurality of channels is between adjacent base sections of the plurality of base sections.

7. The fuel bundle flow limiter of claim 1, wherein the plurality of channels converge at a center of the plurality of base sections.

8. The fuel bundle flow limiter of claim 1, wherein a depth of each of the plurality of channels increases in a direction toward a center of the plurality of base sections.

9. The fuel bundle flow limiter of claim 1, wherein the plurality of vertical webs extend perpendicularly from the plurality of base sections.

10. The fuel bundle flow limiter of claim 1, wherein each of the plurality of vertical webs extends from each of the inner peripheral edges of the plurality of base sections.

11. The fuel bundle flow limiter of claim 1, wherein two vertical webs of the plurality of vertical webs extend from each of the plurality of base sections.

12. The fuel bundle flow limiter of claim 1, wherein a first vertical web of the plurality of vertical webs is parallel to an adjacent second vertical web of the plurality of vertical webs, the first and second vertical webs extending from different base sections.

13. The fuel bundle flow limiter of claim 1, wherein the locking tab is disposed in each of the plurality of vertical webs.

14. The fuel bundle flow limiter of claim 1, wherein each of the plurality of channels is flanked by a pair of vertical webs of the plurality of vertical webs, the locking tab extending into a channel flanked by the pair of vertical webs.

15. The fuel bundle flow limiter of claim 1, further comprising:
  a bottom strip underneath each of the plurality of channels, the bottom strip joining adjacent vertical webs of the plurality of vertical webs.

16. The fuel bundle flow limiter of claim 15, wherein the bottom strip extends along bottom edges of the adjacent vertical webs.

17. The fuel bundle flow limiter of claim 15, wherein the bottom strip is curved.

18. The fuel bundle flow limiter of claim 15, wherein the plurality of vertical webs is between the plurality of base sections and the bottom strip.

19. The fuel bundle flow limiter of claim 1, wherein each of the plurality of vertical webs directly contacts only one adjacent vertical web.

20. The fuel bundle flow limiter of claim 1, wherein adjacent vertical webs of the plurality of vertical webs farm a concave surface that extends inward toward a center of the plurality of base sections.

* * * * *